J. F. F. W. URE.
AERIAL AND OTHER VESSEL AND VEHICLE.
APPLICATION FILED NOV. 14, 1910.
1,021,116.
Patented Mar. 26, 1912.
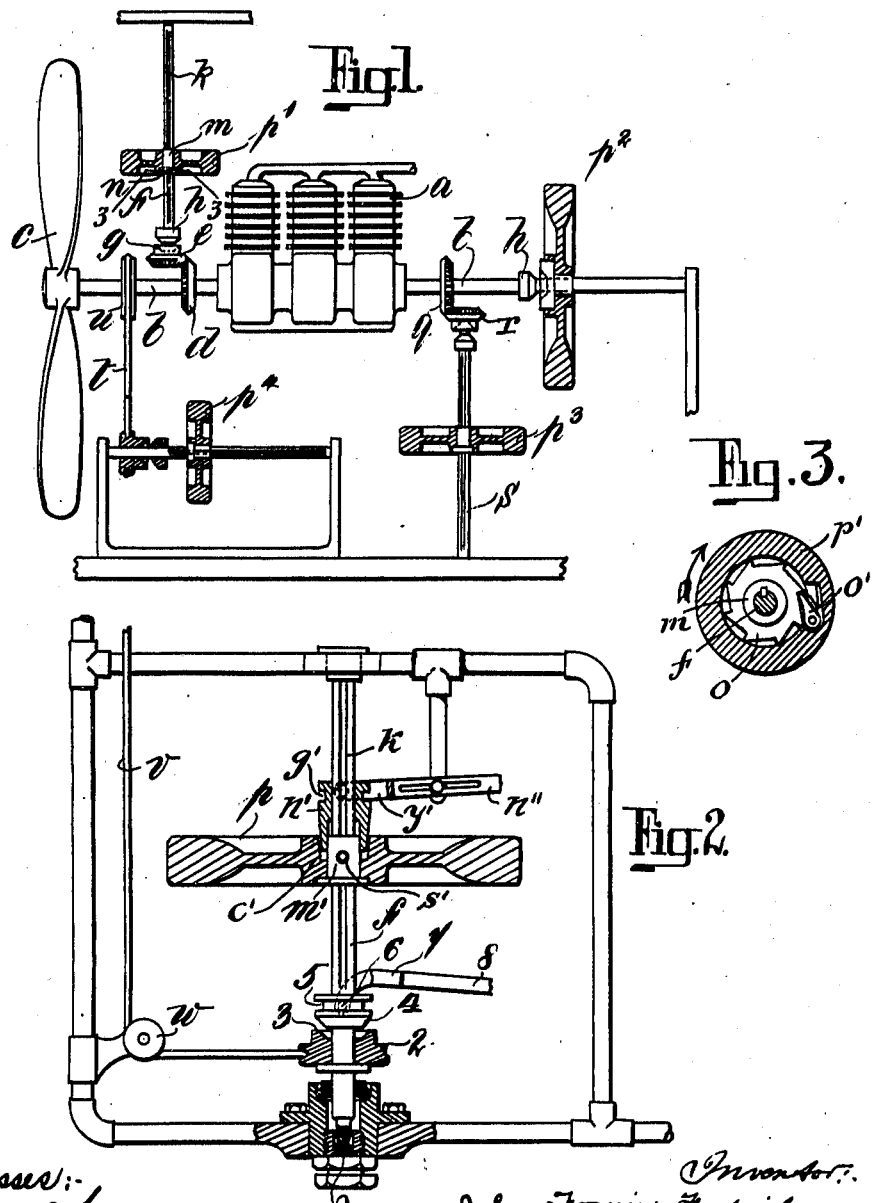

UNITED STATES PATENT OFFICE.

JOHN FRANCIS FREDERICK WHALE URE, OF CHELSEA, LONDON, ENGLAND.

AERIAL AND OTHER VESSEL AND VEHICLE.

1,021,116.   Specification of Letters Patent.   Patented Mar. 26, 1912.

Application filed November 14, 1910. Serial No. 592,209.

*To all whom it may concern:*

Be it known that I, JOHN FRANCIS FREDERICK WHALE URE, a subject of the King of England, residing at 12 Sloane Court, Chelsea, in the county of London, England, have invented certain new and useful Improvements in Aerial and other Vessels and Vehicles; and I do hereby declare the following to be a full, clear, and exact description of the invention, such as will enable others skilled in the art to which it appertains to make and use the same.

This invention relates to aerial and other vessels and vehicles and refers to improved means of giving greater stability to the aerial vessel or the like during its motion.

The invention relates to that type of steadying devices in which one or more fly-wheels are used suitably mounted on the vessel or the like for increasing the stability thereof and refers to a special and advantageous construction of such apparatus whereby the planes in which the various fly-wheels rotate may be varied at will, bringing the planes of rotation near, or setting them farther away from the center of gravity of the system they are designed to stabilize. Further means are provided whereby the fly-wheels may be brought into and put out of action as required and whereby the fly-wheels are enabled to over-run their shafts so that they do not interfere with the propulsion of the vessel or the like when driven from the same engine or engines as the propellers or tractors.

The invention consists generally in providing a shaft for each fly-wheel, the wheel being mounted so that it can be slid longitudinally with respect to such shaft and keyed in any suitable position thereon, a sleeve or its equivalent, between which sleeve and the fly-wheel proper a free wheel mechanism is interposed so that the fly-wheel is enabled to rotate in one direction freely with respect to such sleeve. Any number of such shafts carrying fly-wheels may be mounted on the aerial or other vessel or vehicle in any suitable positions. For instance, in the case of an aerial vessel I mount one shaft vertically so that the fly-wheel thereon may be raised or lowered and fixed in any suitable horizontal plane with respect to the center of gravity of the vessel or the like. And again I might arrange one of such wheels on a sleeve surrounding the shaft operating the propeller or tractor in order to increase the stabilizing action already produced by the rotation of the propeller or propeller and engine where an engine of the Gnome type is employed. Suitable clutching mechanisms are introduced in connection with any or all of the fly-wheels to enable them to be brought into and thrown out of action as required. And in order that my invention may be better understood I will proceed to describe by way of example a method of applying same suitable for instance for use with an aeroplane or other like aerial vessel.

Figure 1 shows diagrammatically four fly-wheels mounted according to my invention, but it will be of course understood that it is not necessary to use all these wheels or to mount them as shown. Fig. 2 shows in detail a modified form for operating one of the wheels. Fig. 3 is an enlarged detail sectional view taken on the line 3—3 of Fig. 1.

The same letters and numerals of reference are employed to denote the same parts in all the views.

With reference to Fig. 1 for the sake of clearness the framework of the aeroplane or other vessel or vehicle and the unessential details such as bearings, etc., have been omitted. $a$ is the engine. $b$ is the shaft which carries the propeller or tractor $c$. $d$ is a bevel wheel keyed to the shaft $b$. $e$ is a bevel pinion mounted loosely on a shaft $f$, and having formed or attached thereto one half of any suitable clutching mechanism $q$.' $h$ is the other half of this clutch which is fixed to the spindle $f$. This spindle is provided with a longitudinal keyway $k$. $m$ is a sleeve which is capable of sliding longitudinally on the shaft $h$ and being keyed at any suitable position thereon in the keyway $k$ by a countersunk set screw or other suitable means. This sleeve $m$ is provided with the inner portion of a free wheel mechanism $n$.

As shown in Fig. 3, the free wheel mechanism $n$ comprises a ratchet wheel $o$ secured to the collar $m$ and a pawl $o'$ carried by the fly wheel $p'$. When the shaft $f$ is rotated in the direction of the arrow, the wheel is caused to rotate through the pawl $o'$ engaging the teeth of the ratchet wheel $o$. However, when the drive shaft $f$ is brought to rest, the fly wheel $p'$ may continue to revolve, through the obtained momentum, by the pawl riding the teeth of the ratchet wheel o.

Referring to the wheel $p^2$ mounted in connection with the main shaft on the right hand side of the engine in the drawing, in this case the part h of the clutch is movable longitudinally with the main shaft b and the other half is attached to or formed with the inner portion of the free wheel mechanism which is itself mounted loosely upon the shaft b. Referring to the wheel $p^3$, q is a bevel wheel gearing with a bevel pinion r. This is mounted at the top of a shaft s, and is mounted and drives in a similar manner to the method in which the bevel pinion e is mounted and drives at the bottom of the shaft f, the rest of the construction for the actuation of the wheel $p^3$ being the same as that described with respect to the wheel $p'$. $p^4$ is another wheel which in this case is driven by the intervention of belt or chain gearing t from the pulley u on the shaft b. In Fig. 1 no mechanism is shown in any case for bringing the clutches into engagement or for disengaging them but it will be understood that any suitable device may be adapted for this purpose.

With reference to the action of the various wheels shown at Fig. 1 in the case of a wheel such as $p'$, this is utilized for increasing the stability of the vessel or the like with respect to the horizontal plane, the best position for the wheel itself on the vertical shaft being determined by calculation or experiment, and being adjustable according to the weight to be carried, the centers of pressure and gravity and other incidental considerations. A wheel such as $p^3$ is also adapted to increase the stability with respect to the horizontal plane. It will be understood that if desired a vertical shaft may be employed running from top to bottom and provided with one or more wheels toward the top and bottom or in any other suitable positions. With respect to the wheels $p^2$ and $p^4$ these are adapted to increase stability with respect to a vertical plane cutting the main shaft at right angles.

In some cases it may be desirable to locate the wheel $p^2$ in close proximity to the propeller or tractor in order to have a greater stabilizing effect in that locality.

As shown in Fig. 2 the sleeve $m'$, held in an adjusted position on the shaft f by a countersunk set screw $s'$, supports a fly wheel p with free circumferential movement therebetween. In order to transmit movement of the shaft f, through the sleeve $m'$, to the wheel p, a suitable friction cone $n'$ is provided, slidable on the shaft f, which may be actuated through the lever $n''$ to form binding action between the sleeve $m'$ and a friction cup $c'$ formed in the wheel p. The cone $n'$ rotates with the sleeve and wheel when in binding engagement therewith, the connection between the cone and lever $n'$ being any well known means, such as a yoke $y'$, placed in a groove $g'$ of the cone hub.

The foregoing mechanism comprises a modification of means allowing free movement of the fly-wheel, with respect to its shaft, when such is desired for stabilizing purposes for preventing further actuation of the shaft through the attained momentum of the fly-wheel when the engine is started. In this case the drive from the propeller or other shaft takes place through the belt or chain v around the jockey pulleys w and around the pulley 2, which is mounted loosely on the shaft f. This pulley is provided with one half 3 of a clutch, the other half 4 of which clutch is fixed to the spindle f and is provided with an annular groove at the top 5 into which studs 6 projecting inwardly from a fork 7 engage. The fork 7 is in connection with a suitable lever 8 by means of which the half 4 of the clutch can be thrown into or brought out of engagement with the part 3 on the driving pulley 2, thus communicating the rotation to the shaft f. The shaft f is mounted on the bottom with ball bearings 9.

Although I have described the various wheels as actuated from the main driving motor for the aeroplane or other vessel, I may in some cases find it desirable to employ a separate or secondary engine for driving these wheels. I may also provide means in connection with the principal driving motor by which the wheels can be driven even when the propeller or tractor is at rest, and which will continue running during the planing down of an aeroplane with the engine stopped. In other cases it may not be desired to provide clutching mechanism in connection with the wheels, in which case they may be driven from the principal or other engine with free wheel mechanism and without clutching mechanism.

It will be observed that the advantage of providing free wheel or clutch mechanism between the fly wheel and drive shaft is that it prevents the wheel having any accelerating effect upon the propeller or tractor when it is desired to slow down the engine, which might lead to accidents or prevent the machine being fully under the control of the airman or navigator, the wheel being allowed to revolve freely while the shaft remains at rest.

It will be understood in conclusion that the methods of carrying out the invention herein described and shown on the accompanying drawings are given by way of example, as the details of construction may be varied largely to suit the requirements of particular cases without departing from the main principles of the invention.

What I claim and desire to secure by Let- ters Patent of the United States of America is:—

1. The combination with an aeroplane structure, of a power driven shaft, a fly-wheel slidably mounted thereon, means positioning said wheel on said shaft loosely for rotation in a predetermined plane, and means transmitting motion from said shaft to said wheel.

2. The combination with an aeroplane structure, of a main drive shaft, a shaft perpendicular thereto adapted to be rotated by said shaft, fly-wheels slidably mounted on said shafts, means positioning said wheels on said shafts loosely for rotation in predetermined planes, and means transmitting motion from said shafts to said wheels, substantially as described and for the purpose set forth.

3. The combination with an aeroplane structure, of a power driven shaft, shafts perpendicular thereto, a shaft parallel to the power driven shaft, means transmitting motion from said drive shaft to said shafts, a fly-wheel slidably mounted on each shaft, means positioning said wheel on said shaft loosely for rotation in a predetermined plane, and means transmitting motion from said shaft to said wheel, substantially as described and for the purpose set forth.

4. The combination with an aeroplane structure, a power driven shaft, a shaft parallel thereto, means transmitting motion from said drive shaft to said parallel shaft, a fly-wheel mounted on each shaft, means positioning said wheel on said shaft loosely for rotation in a predetermined plane, and means transmitting motion from said shaft to said wheel, substantially as described and for the purpose set forth.

5. The combination with an aeroplane structure, of a plurality of horizontal shafts, a plurality of vertical shafts, means transmitting motion to said shafts, a fly-wheel slidably mounted on each shaft, means positioning said wheels on said shafts loosely for rotation in predetermined planes, and means transmitting motion from said shafts to said wheels, substantially as described and for the purpose set forth.

6. The combination with an aeroplane structure, of a plurality of horizontal shafts, a plurality of vertical shafts, means transmitting motion to said shafts, means whereby any of the shafts may be thrown out of operative relation with the motion transmitting means, a fly-wheel loosely mounted on each of the shafts, means positioning said wheel on said shaft loosely for rotation in predetermined planes, and means whereby said wheels may be thrown out of operative motion transmitting relation to said shafts.

In testimony whereof, I affix my signature, in presence of two witnesses.

JOHN FRANCIS FREDERICK WHALE URE.

Witnesses:
H. D. JAMESON,
C. P. LIDDON.